United States Patent
Shimamura et al.

(10) Patent No.: US 9,715,374 B2
(45) Date of Patent: Jul. 25, 2017

(54) MULTI-BRANCH DETERMINATION SYNTAX OPTIMIZATION APPARATUS

(71) Applicants: KABUSHIKI KAISHA TOSHIBA, Minato-ku (JP); TOSHIBA SOLUTIONS CORPORATION, Kawasaki-shi (JP)

(72) Inventors: Makoto Shimamura, Kawasaki (JP); Kei Yamaji, Kunitachi (JP); Mototaka Kanematsu, Yokohama (JP)

(73) Assignees: Kabushiki Kaisha Toshiba, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 0 days.

(21) Appl. No.: 14/771,993

(22) PCT Filed: Feb. 28, 2014

(86) PCT No.: PCT/JP2014/001116
§ 371 (c)(1),
(2) Date: Sep. 1, 2015

(87) PCT Pub. No.: WO2014/132668
PCT Pub. Date: Sep. 4, 2014

(65) Prior Publication Data
US 2015/0363177 A1    Dec. 17, 2015

(30) Foreign Application Priority Data

Mar. 1, 2013  (JP) .................................. 2013-040932
Feb. 27, 2014  (JP) .................................. 2014-037149

(51) Int. Cl.
*G06F 9/38*  (2006.01)
*G06F 9/45*  (2006.01)

(52) U.S. Cl.
CPC .............. *G06F 8/425* (2013.01); *G06F 8/443* (2013.01); *G06F 8/4441* (2013.01); *G06F 9/38* (2013.01)

(58) Field of Classification Search
None
See application file for complete search history.

(56) References Cited

U.S. PATENT DOCUMENTS 5,339,420 A    8/1994  Hoxey
6,035,123 A *  3/2000  Razdan .................. G06F 8/443
                                                   712/E9.035
(Continued)

FOREIGN PATENT DOCUMENTS

JP    4 330527    11/1992
JP    7 160490     6/1995
(Continued)

OTHER PUBLICATIONS

Thielmann et al. "Precore-A token-based speculation architecture for high-level language to hardware compilation." Field Programmable Logic and Applications (FPL), 2011 International Conference on. IEEE, 2011.Retrieved on [May 15, 2017] Retrieved from the Internet: URL<http://ieeexplore.ieee.org/abstract/document/6044795/.*

(Continued)

*Primary Examiner* — Thuy Dao
*Assistant Examiner* — Cheneca Smith
(74) *Attorney, Agent, or Firm* — Oblon, McClelland, Maier & Neustadt, L.L.P.

(57) ABSTRACT

A multi-branch determination syntax optimization apparatus includes: a memory that retains multi-branch determination syntax including tokens; a database that retains (1) CPU performance information being a parameter depending on a CPU incorporated in the multi-branch determination syntax (Continued)

optimization apparatus and set based on time required for multi-branch determination processing and (2) frequently-appearing token table representing types and rates of appearance of tokens sorted in order of appearance frequency in a query that statically analyzes a source code and performs lexical analysis in advance; and a conversion section that executes determination for the multi-branch determination syntax by referring to the CPU performance information and the frequently-appearing token table, and creates a branch code converted to make a speculatively executable branch for the token type having a high frequency of appearance and to make a branch using the jump table for the token type having a low frequency of appearance.

7 Claims, 4 Drawing Sheets

(56) References Cited

U.S. PATENT DOCUMENTS

| | | | |
|---|---|---|---|
| 6,381,739 B1* | 4/2002 | Breternitz, Jr. | G06F 8/443 714/37 |
| 6,412,105 B1* | 6/2002 | Maslennikov | G06F 8/445 717/151 |
| 6,986,131 B2* | 1/2006 | Thompson | G06F 8/4452 712/233 |
| 7,996,827 B2* | 8/2011 | Vorbach | G06F 8/447 717/121 |
| 8,001,510 B1* | 8/2011 | Miller | G06F 17/5045 716/102 |
| 2003/0233643 A1* | 12/2003 | Thompson | G06F 8/4452 717/161 |
| 2006/0130016 A1* | 6/2006 | Wagner | G06F 9/4812 717/136 |
| 2008/0082805 A1 | 4/2008 | Wakabayashi | |
| 2011/0066829 A1* | 3/2011 | Tye | G06F 8/4441 712/226 |
| 2011/0219357 A1* | 9/2011 | Livshits | G06F 9/445 717/115 |
| 2014/0281382 A1* | 9/2014 | Smith | G06F 9/30 712/42 |

FOREIGN PATENT DOCUMENTS

| | | |
|---|---|---|
| JP | 7 160499 | 6/1995 |
| JP | 9 288581 | 11/1997 |
| JP | 2008 90439 | 4/2008 |

OTHER PUBLICATIONS

Zeidler, Steffen, et al. "Design of a test processor for asynchronous chip test." Test Symposium (ATS), 2011 20th Asian. IEEE, 2011. Retrieved on [May 15, 2017] Retrieved from the Internet: URL<http://ieeexplore.ieee.org/abstract/document/6114497/>.*

International Search Report Issued Apr. 1, 2014 in PCT/JP2014/001116 filed Feb. 28, 2014.

Onuki, T., "Saishin Processor o Ikasu Sekkei Shuho to Seino Hikaku: Chapter 1 Saishin Processor no Seino o Ikasu System Sekkei Knowhow", Interface, vol. 24, No. 2, (2 pages), Feb. 1, 1998.

* cited by examiner

FIG. 1

FORM IN WHICH SPECULATIVE EXECUTION IS POSSIBLE
(if-else switch STATEMENT)

```
switch(rval) {
    case 0: ~ ; break ;
    case 1: ~ ; break ;
    case 2: ~ ; break ;
    case 3: ~ ; break ;
    default: ~ ; break ;
}
```

FORM IN WHICH SPECULATIVE EXECUTION IS IMPOSSIBLE
(JUMP TABLE IS USED)

```
switch(rval) {
    case 0: ~ ; break ;
    case 1: ~ ; break ;
    case 2: ~ ; break ;
    case 3: ~ ; break ;
    case 4: ~ ; break ;
    case 5: ~ ; break ;
    default: ~ ; break ;
}
```

FIG. 2

IN CASE OF if-else switch STATEMENT

```
e24:  cmp   $0x1,  %eax
e27:  je    e49
e29:  cmp   $0x1,  %eax
e2c:  jg    e34      # rval>1
e2e:  test  %eax,  %eax
e30:  je    e40      # rval==0
e32:  jmp   e64      # rval==1
e34:  cmp   $0x2,  %eax
e37:  je    e52      # rval==2
e39:  cmp   $0x3,  %eax
e3c:  je    e5b      # rval==3
e3e:  jmp   e64      # default
```

STATIC BRANCHES CONTINUE TO ALLOW SPECULATIVE EXECUTION

IN CASE OF JUMP TABLE

```
f83:  mov   -0x8(%rbp),  %eax
f86:  mov   0x401548(,%rax,8), %rax
f8e:  jmpq  *%rax
```

NUMBER OF INSTRUCTIONS IS SMALL, BUT INDIRECT JUMP OCCURS, SO THAT BRANCH DESTINATION IS NOT FIXED UNTIL VERY LAST MOMENT

FIG. 3

```
for(i=0;i<100*1000*10000;i++){
   r *=103;
   int rval = (r >> 8) % 8;
   volatile int result;
   switch(rval){
     case 0: result = 0; break;
     case 1: result = 2; break;
     case 2: result = 7; break;
     case 3: result = 4; break;
     default;
       switch(rval){
         case 4: result = 100; break;
         case 5: result = 10; break;
         case 6: result = 100; break;
         case 7: result = 10; break;
       }
   }
}
```

304 ms

```
for(i=0;i<100*1000*1000;i++){
   r *=103;
   int rval = (r >> 8) % 8;
   volatile int result;
   switch(rval){
     case 0: result = 0; break;
     case 1: result = 2; break;
     case 2: result = 7; break;
     case 3: result = 4; break;
     case 4: result = 100; break;
     case 5: result = 10; break;
     case 6: result = 100; break;
     case 7: result = 10; break;
   }
}
```

888 ms

MULTI-BRANCH DETERMINATION SYNTAX OPTIMIZATION APPARATUS

TECHNICAL FIELD

The present invention relates to a multi-branch determination syntax optimization apparatus.

BACKGROUND ART

Generally, in lexical analysis, the first character to be processed is checked for token type determination, followed by detailed determination.

In a relational database management system, a ratio of a processing time required for lexical analysis to the entire processing time is small, so that a processing speed of the lexical analysis is not a big problem.

However, in so-called an in-memory database, a processing speed of an I/O device is high, so that an increase in the processing speed required for the lexical analysis is required.

A jump table (branch destination table) is often used in multi-branch determination syntax used in the lexical analysis. However, a jump mode of the jump table is a register indirect jump in which a branch destination address is loaded from a memory into a register, so that a branch destination is not fixed until the memory is read. This makes it impossible to speculatively execute the branch destination, with the result that it takes much processing time due to waiting for pipeline flush or reload.

CITATION LIST

Patent Document

Patent Document 1: Jpn. Pat. Appln. Laid-Open Publication No. 9-288581

Patent Document 2: Jpn. Pat. Appln. Laid-Open Publication No. 7-160490

Disclosure of the Invention

Problems to be Solved by the Invention

An object of the present invention is to provide a multi-branch determination syntax optimization apparatus capable of skillfully utilizing speculative execution.

Means for Solving the Problems

A multi-branch determination syntax optimization apparatus according to an embodiment includes: a memory that retains multi-branch determination syntax including tokens; a database section that retains CPU performance information and a frequently-appearing token table, the CPU performance information being a parameter depending on a CPU incorporated in the multi-branch determination syntax optimization apparatus and set based on time required for multi-branch determination processing, the frequently-appearing token table representing types and rates of appearance of tokens sorted in order of appearance frequency in a query that statically analyzes a source code and performs lexical analysis in advance; and a conversion section that executes determination for the multi-branch determination syntax by referring to the CPU performance information and the frequently-appearing token table, and creates a branch code converted so as to make a speculatively executable branch for the token type having a high frequency of appearance and so as to make a branch using the jump table for the token type having a low frequency of appearance.

BRIEF DESCRIPTION OF THE DRAWINGS

FIG. 1 is a view for explaining expression forms in which speculative execution is possible/impossible;

FIG. 2 is a view for explaining a comparison between an if-else switch statement and a jump table in an assembler level;

FIG. 3 is a view for explaining high-speed processing achieved by the speculative execution;

BEST MODE FOR CARRYING OUT THE INVENTION

Figure 4:
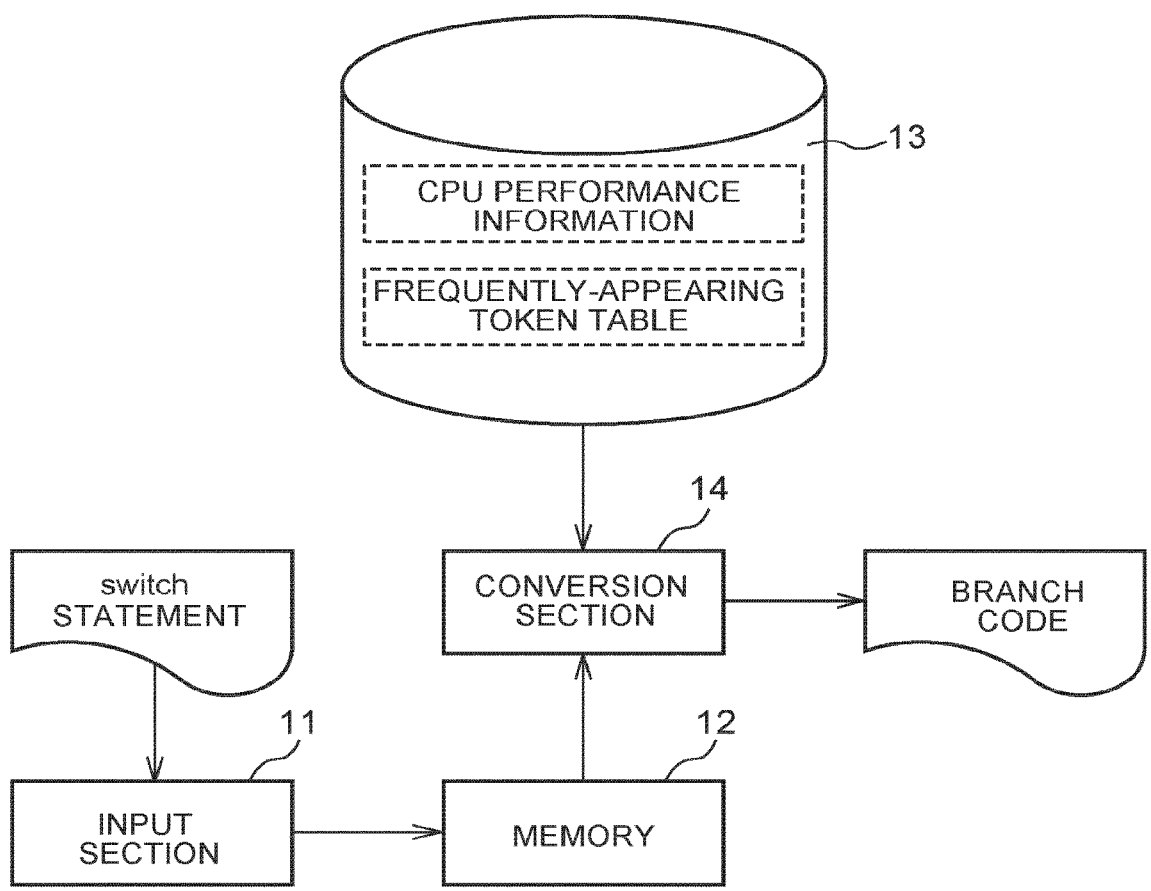
FIG. 4 is a block diagram illustrating a schematic configuration of a multi-branch determination syntax optimization apparatus according to the embodiment of the present invention.

An embodiment of the present invention will be described below with reference to the drawings. Throughout the drawings, the same reference numerals are used to designate the same or similar components, and redundant descriptions thereof are omitted. The embodiment described below is an embodiment in which the present invention is applied to lexical analysis processing of an SQL query.

First, main terms used in the present embodiment will be described.

The term "lexical analysis" refers to processing of analyzing a program described in a programming language, in which a character, a space, and a symbol are subjected to discrimination to divide a character string into tokens.

The term "syntax analysis" refers to processing of analyzing a program described in a programming language, in which whether or not a token string conforms to a grammar of the programming language is examined.

The term "query" refers to a character string to be input to a lexical analyzer. Hereinafter, it is assumed that alphabets in the character string constituting the query are written in upper cases.

The term "token" refers to the smallest unit of the character string, which is a reserved word or a symbol ID accepted by a syntax analyzer. Examples of the token type further include an operator, a space character, a text, an escape character, parentheses, and a comment.

The term "jump table" refers to a table in which the branch destination address corresponding to a value used in branch is written.

The term "speculative execution" refers to an optimization method used when the multi-branch determination syntax is compiled to generate an object code. In the speculative execution, when the program is branched in the way, processing to be executed in the branch destination is previously executed. When the prediction succeeds, it is not necessary to wait for determination of the processing, so that the branch processing is speeded up; on the other hand, when the prediction fails, a result obtained through the speculative execution is discarded, and an instruction of a correct branch destination is executed.

Generally, in the lexical analysis, the first character to be processed is checked to for token type determination (for example, whether the token type is alphabet or numeric character), followed by detailed determination (in a case of e.g., alphabet, whether the first character is "S" or "F"). Here, a branch occurs on the token type.

In a procedural programming language, such as C language, a switch statement is available as the multi-branch determination syntax. The switch statement makes the subsequent processing different according to a value of a variable to be evaluated and may be converted by a compiler into a form of the jump table. In a case of an if-else switch statement to be described later, static branches continue, and thus the speculative execution is possible. FIG. 1 is a view for explaining expression forms in which the speculative execution is possible/impossible. FIG. 2 is a view for explaining a comparison between the if-else switch statement and jump table in an assembler level. FIG. 3 is a view for explaining high-speed processing achieved by the speculative execution. In the exempla of FIG. 3, a result of measurement of a loop including 100,000,000 random branches is compared. A processing time can be shortened to about ⅓ due to utilization of the speculative execution.

In the present embodiment, in order to enable the speculative execution, a source code of the switch statement that determines the token in the lexical analysis is converted so as to make a speculatively executable branch for the token type having a high frequency of appearance and so as to make a branch using the jump table for the token type having a low frequency of appearance.

FIG. 4 is a block diagram illustrating a schematic configuration of a processing apparatus for optimizing multi-branch determination syntax according to the embodiment of the present invention. This apparatus is realized by using a general-purpose computer (e.g., a personal computer (PC)) and software operating on the computer. Examples of the computer also include an engineering workstation (EWS) suitable for CAD (Computer Aided Design) and CAE (Computer Aided Engineering). The present embodiment can allow such a computer to execute a program for extraction of frequently-appearing token type from the switch statement and branch determination.

As illustrated in FIG. 4, the processing apparatus for optimizing multi-branch determination syntax according to the present embodiment mainly includes an input section 11, a memory 12, a database 13, and a conversion section 14.

The input section 11 inputs the switch statement which is the multi-branch determination syntax. The input switch statement is retained in the memory 12. The switch statement retained in the memory 12 is sent to the conversion section 14.

The database 13 retains "CPU performance information" and frequently-appearing token table.

The CPU performance information is a parameter depending on a CPU and is set based on a time required for the CPU to perform multi-branch determination. For example, the CPU performance information is set such that an execution time of a comparison instruction which is executed n times and execution time of the jump table are equal to each other, wherein n is set to the CPU performance information.

For example, in setting of the value n, in a case of an if statement that contains an else clause, wherein a branch condition expression is FALSE, a continuous comparison by the if-else statement that executes a statement specified immediately after the else and a case using the jump table are compared. The present inventor made an experiment using Core i7 (registered trademark) made by Intel as the CPU. The result is as follows. In a case of 15 branches, a processing time by if statement is 1,874 ms and a processing time by jump table is 1,892 ms, which are substantially equal to each other. In a case of 16 branches, a processing time by if statement is 531 ms and a processing time by jump table is 804 ms. Further, in a case of 32 branches, a processing time by if statement is 1,184 ms and a processing time by jump table is 873 ms. This reveals that the processing speed by the jump table is lower up to the 16 branches. Thus, in the case where Core i7 (registered trademark) made by Intel is used as the CPU, the CPU performance information is 16, that is, the number of comparisons up to 16 is suitable for effectiveness determination of optimization according to the present embodiment.

The frequently-appearing token table is a table (pair of character type and probability) describing which character frequently appears in the query to be subjected to the lexical analysis. For example, in SQL, alphabet, space, numeral, *, +, −, and ( ) are listed as the frequently-appearing tokens.

<Method of Determining Frequently-Appearing Token Table>

A method of determining the frequently-appearing token table will be described using the following SQL query. The frequently-appearing token table is created based on a result obtained by previously reading a source code and statically analyzing it.

"SELECT FDNC (*) FROM TABLE WHERE COND (P+1)=1 AND X=Y"

Appearance frequency of reserved word: 4 (SELECT, FROM, WHERE, AND)

Appearance frequency of appearance of ID: 6 (FDNC, TABLE, COND, P, X, Y)

Appearance frequency of space: 7

Appearance frequency of ( ): 4 (two left parentheses and two right parentheses)

Appearance frequency of numeral: 2 (two "1")

Appearance frequency of =: 2

Appearance frequency of +: 1

Appearance frequency of *: 1

Thus, in this example, a total number of the tokens is 27.

An appearance rate of the token for each type is as follows:

Appearance rate of alphabet: 37% (10/27)
Appearance rate of space: 26% (7/27)
Appearance rate of ( ): 15% (4/27)
Appearance rate of numeral: 7% (2/27)
Appearance rate of =: 7% (2/27)
Appearance rate of +: 3% (1/27)
Appearance rate of *: 3% (1/27)

Thus, the descending order of the tokens in terms of appearance frequency is as follows: alphabet, space, ( ), numeral, =, +, and *.

Now, a case where the token type is determined in the read source code is considered. For example, in order to determine that a character represented by an ASCII code is "alphabet", two comparisons are required since it is determined whether the character is equal to or greater than "A" and equal to or less than "Z". Similarly, in order to determine that a target character is "numeral", two comparisons are required since it is determined whether the character is equal to or greater than "0" and equal to or less than "9". Further, in order to determine that a target character is "space", four comparisons are required since the "space" on the SQL language includes a tab and two types of a line feed code (carriage return CR and line field LF). Thus, from the frequently-appearing token table in which the tokens are arranged in the descending order of the appearance frequency, one type (alphabet) can be determined in two comparisons, and two types (alphabet and space) can be determined in six comparisons. In the above example, the number of types in the frequently-appearing token table is 7.

In the present embodiment, in compiling a huge switch statement, it is determined, by referring to the CPU performance information and frequently-appearing token table, whether to branch the switch statement as the if-else switch statement or to branch the same using the jump table for high speed processing. That is, when [n−number of times of comparison]=0, the processing speed is lower in branching the switch statement as the if-else switch statement. In other words, when a sum of the appearance rates of some types taken from the frequently-appearing token table in which the tokens are arranged in the descending order of the appearance frequency does not exceed a given threshold value (e.g., 60%), the speed-up effect is small.

For example, the number of token types up to which a total sum obtained by accumulating the appearance rates of the tokens selected in the descending order in terms of the appearance rate first exceeds 60% is set as "m". In the above example, when the appearance rate 37% of alphabet and appearance rate 26% of space are added, 63% is obtained and, thus, a minimum value of m is 2. When n representing the CPU performance is equal to or less than m, the processing speed is higher in branching using the jump table than in branching the switch statement as the if-else switch statement. For example, in the SQL statement, taking a character c as an example, it is necessary to determine $c>='A'$, $c<='Z'$, and $c==' '$ in order to calculate the appearance rate, so that m is equal to or larger than 3.

The conversion section 14 analyzes the switch statement while referring to the CPU performance information and frequently-appearing token table retained in the database 13 to extract the frequently-appearing token types from the switch statement. Then, the conversion section 14 generates a branch code converted so as to make a speculatively executable branch for the token type having a high frequency of appearance and so as to make a branch using the jump table for the token type having a low frequency of appearance. The branch code is not limited to so-called a high level language, but may be an intermediate code to be interpreted by a compiler.

<Flow of Lexical Analysis Processing>

The following describes a flow of the lexical analysis processing in the thus configured multi-branch determination syntax optimization apparatus 100.

Figure 5:
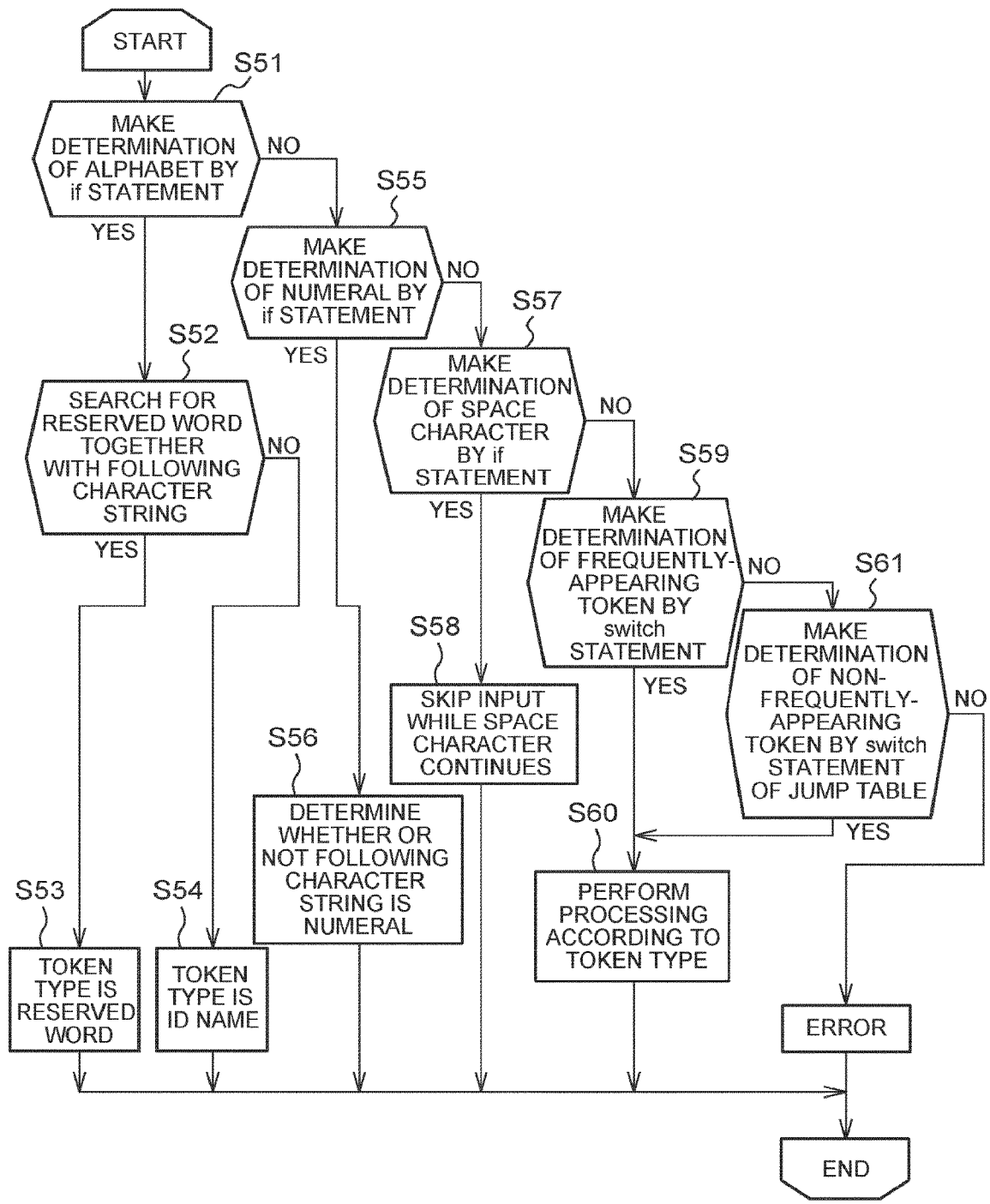
FIG. 5 is a flowchart illustrating a flow of optimization processing performed in the multi-branch determination syntax optimization apparatus according to the embodiment.

FIG. 5 is a flowchart illustrating a flow of the lexical analysis processing in the thus configured multi-branch determination syntax optimization apparatus 100 according to the embodiment. As described above, the frequently-appearing token types include alphabet, space, and numeral, which are then determined by an if statement. Note that it is preferable previously convert a lower case into an upper case for subsequent determination processing.

First, determination of alphabet is made by the if statement (step S51). As described above, identification of alphabet requires three comparisons.

When a target character is the alphabet (Yes in step S51), a reserved word is searched together with the following character string (step S52).

When the reserved word is hit (Yes in step S52), the token type is determined to be the reserved word (step S53), and the lexical analysis processing is ended. When the reserved word is not hit (No in step S52), the token type is determined to be the ID name (step S54), and the lexical analysis processing is ended.

When the target character is not the alphabet (No in step S51), determination of the numeral is made by the if statement (step S55). Identification of numeral requires two comparisons: $c>='0'$, $c<='9'$.

When the target character is the numeral (Yes in step S55), it is determined whether or not the following character string is the numeral (step S56), and the lexical analysis processing is ended.

When the target character is not the numeral (No in step S55), determination of the space character is made by the if statement (step S57).

When the target character is the space character (Yes in step S57), the input is skipped while the space characters continue (step S58), and the lexical analysis processing is ended.

When the target character is not the space character (No in step S57), determination of the frequently-appearing token is made by the if-else switch statement (step S59).

When the target token is the frequently-appearing token (Yes in step S59), processing according to determined token type is performed (step S60), and the lexical analysis processing is ended. As described above, ( ), =, and the like are identified.

When the target token is not the frequently-appearing token (No in step S59), determination of a non-frequently appearing token is made by the switch statement of the jump table (step S61).

When the target token is the non-frequently appearing token (Yes in step S61), processing according to determined token type is performed (step S60), and the lexical analysis processing is ended. When the target token is not the non-frequently appearing token (No in step S61), an error is determined to end the lexical analysis processing.

<Effect of Optimization>

The effect of the optimization according to the present embodiment is compared with a lexical analysis routine of SQLite. In the SQLite lexical analysis, the switch statement is used for determination of the operator and special symbol, and the number of branch cases is 43. The reserved word and ID name are determined by a default section, and context determination is assigned to a syntax analyzer.

The following SQL statement was subjected to lexical analysis 1,000,000 times, and the time required for the analysis was measured.

'SELECT FUNC(*) FROM TABLE WHERE COND (P+1)=1 AND X=Y'

In the lexical analysis, the alphabet, space, numeral, ( ), =, *, and + are determined first, and then others are determined by the jump table. As the CPU, Intel Core i7 (registered trademark) is used, wherein n is set to 16.

As a result, 597 ms were taken in the SQLite lexical analysis routine; while 381 ms were taken in the present embodiment. Thus, the processing speed is improved by about 36%.

As described above, according to the present embodiment, by optimizing the multi-branch determination syntax capable of skillfully utilizing the speculative execution, the lexical analysis can be speeded up.

Although the preferred embodiments of the present invention have been described above, the embodiments are merely illustrative and do not limit the scope of the present invention. These novel embodiments can be practiced in other various forms, and various omissions, substitutions and changes may be made without departing from the scope of the invention. The embodiments and modifications thereof are included in the scope or spirit of the present invention and in the appended claims and their equivalents.

The invention claimed is:

1. A multi-branch determination syntax optimization apparatus characterized by comprising:

a memory that retains multi-branch determination syntax including tokens;

a database section that retains CPU performance information and a frequently-appearing token table, the CPU performance information being a parameter depending on a CPU incorporated in the multi-branch determination syntax optimization apparatus and set based on time required for multi-branch determination processing, the frequently-appearing token table representing types and rates of an appearance of tokens sorted in order of appearance frequency in a query that statically analyzes a source code and performs lexical analysis in advance; and a conversion section that executes a determination for the multi-branch determination syntax by referring to the CPU performance information and the frequently-appearing token table, and creates a branch code converted so as to make a speculatively executable branch for a first token type having a high frequency of appearance and so as to make a branch using a jump table for a second token type having a low frequency of appearance, wherein the CPU performance information is a value set such that an execution time of a comparison instruction that is executed n times equals an execution time of the jump table, wherein a value of n is set to the CPU performance information and n is a positive integer.

2. The multi-branch determination syntax optimization apparatus according to claim 1, characterized in that the multi-branch determination syntax is a switch statement, and the speculatively executable branch is branch generated by an if-else switch statement.

3. The multi-branch determination syntax optimization apparatus according to claim 1, characterized in that the value of n is set by comparing an execution time required for continuous execution of an if-else switch statement and the execution time of the jump table.

4. The multi-branch determination syntax optimization apparatus according to claim 1, characterized in that when a ratio of a number of appearances of token to a total number of tokens equals an appearance rate, the value of n is set smaller than a value of m, wherein the value of m is a number of token types up to a total sum obtained by accumulating the appearance rates of the tokens selected in the descending order in terms of the appearance rate first exceeds a predetermined threshold.

5. The multi-branch determination syntax optimization apparatus according to claim 1, characterized in that the branch code is a branch code written in a high level language.

6. The multi-branch determination syntax optimization apparatus according to claim 1, characterized in that the branch code is an intermediate code to be interpreted by a compiler.

7. A non-transitory computer-readable recording medium including:

a first file storing multi-branch determination syntax including tokens;

a second file storing CPU performance information which is a parameter depending on a CPU incorporated in the multi-branch determination syntax optimization apparatus and set based on time required for multi-branch determination processing; and a database file storing a frequently-appearing token table representing types and rates of an appearance of tokens sorted in order of appearance frequency in a query that statically analyzes a source code and performs lexical analysis in advance, and a program that executes determination for the multi-branch determination syntax by referring to the CPU performance information and the frequently-appearing token table, and creates a branch code converted so as to make a speculatively executable branch for a first token type having a high frequency of appearance and so as to make a branch using a jump table for a second token type having a low frequency of appearance, wherein the CPU performance information is a value set such that an execution time of a comparison instruction that is executed n times equals an execution time of the jump table, wherein a value of n is set to the CPU performance information and n is a positive integer.

* * * * *